US008719340B2

(12) United States Patent
Ushioda et al.

(10) Patent No.: US 8,719,340 B2
(45) Date of Patent: May 6, 2014

(54) INFORMATION PROCESSING DEVICE, CONTENT PROVIDING METHOD AND PROGRAM (75) Inventors: Takahiro Ushioda, Tokyo (JP); Hiroki Inamitsu, Tokyo (JP); Ryo Sokabe, Saitama (JP); Naoki Yuasa, Chiba (JP)

(73) Assignee: Sony Corporation (JP)

( * ) Notice: Subject to any disclaimer, the term of this patent is extended or adjusted under 35 U.S.C. 154(b) by 62 days.

(21) Appl. No.: 13/164,880

(22) Filed: Jun. 21, 2011

(65) Prior Publication Data

US 2012/0005265 A1 Jan. 5, 2012

(30) Foreign Application Priority Data

Jun. 30, 2010 (JP) ................. P2010-149367

(51) Int. Cl.
*G06F 15/16* (2006.01)
(52) U.S. Cl.
USPC ........................................................ 709/203
(58) Field of Classification Search
None
See application file for complete search history.

(56) References Cited

U.S. PATENT DOCUMENTS

| 5,732,217 | A  | * | 3/1998  | Emura ............................ 725/90 |
| 7,100,192 | B1 | * | 8/2006  | Igawa et al. .................... 725/112 |
| 7,272,645 | B2 | * | 9/2007  | Chang et al. ................... 709/223 |
| 7,356,556 | B2 | * | 4/2008  | Brydon et al. ................. 709/200 |
| 7,454,480 | B2 | * | 11/2008 | Labio et al. .................... 709/217 |
| 7,475,132 | B2 | * | 1/2009  | Chang et al. ................... 709/223 |
| 2002/0178261 | A1 | * | 11/2002 | Chang et al. ................... 709/225 |
| 2003/0028561 | A1 | * | 2/2003  | Gounares et al. .............. 707/513 |
| 2003/0088571 | A1 | * | 5/2003  | Ekkel ............................. 707/100 |
| 2003/0145093 | A1 | * | 7/2003  | Oren et al. ..................... 709/229 |
| 2005/0165688 | A1 | * | 7/2005  | Matsushima et al. ........... 705/52 |
| 2005/0203991 | A1 | * | 9/2005  | Kawamura et al. ............ 709/203 |
| 2006/0031502 | A1 | * | 2/2006  | Yoshimine et al. ............ 709/225 |
| 2006/0036672 | A1 | * | 2/2006  | Cha et al. ....................... 709/202 |
| 2006/0036742 | A1 | * | 2/2006  | Yoshimine et al. ............ 709/227 |
| 2006/0173846 | A1 | * | 8/2006  | Omae et al. ....................... 707/9 |
| 2006/0212771 | A1 | * | 9/2006  | Fabbrocino ..................... 714/746 |
| 2006/0218274 | A1 | * | 9/2006  | Labio et al. .................... 709/224 |
| 2006/0218275 | A1 | * | 9/2006  | Labio et al. .................... 709/224 |
| 2006/0253330 | A1 | * | 11/2006 | Maggio et al. ................... 705/14 |
| 2006/0282319 | A1 | * | 12/2006 | Maggio ............................ 705/14 |

(Continued)

FOREIGN PATENT DOCUMENTS

JP 2007-519082 T 7/2007
JP 2008-040893 A 2/2008

OTHER PUBLICATIONS

LimeWire User Manual, Apr. 30, 2004, Limewire, 4.0, All.*

*Primary Examiner* — Ninos Donabed
(74) *Attorney, Agent, or Firm* — Lerner, David, Littenberg, Krumholz & Mentlik, LLP (57) ABSTRACT According to an embodiment of the present disclosure, there is provided an information processing device, comprising a communicating unit capable of communicating with one or more content servers through a network, an information obtaining unit for obtaining content type information indicating a type of content, which may be provided by each of the one or more content servers, from each content server using communication by the communicating unit, and a user interface unit for allowing a user to select a desired content type out of the content type indicated by the content type information and allowing the content server capable of providing at least one content belonging to the selected content type to provide the at least one content. The content type information is the information capable of identifying a type of a container included in a content directory of each content server.

9 Claims, 10 Drawing Sheets (56) References Cited

U.S. PATENT DOCUMENTS

| | | | |
|---|---|---|---|
| 2007/0043847 A1* | 2/2007 | Carter et al. | 709/223 |
| 2007/0118606 A1 | 5/2007 | Duncan et al. | |
| 2007/0118857 A1* | 5/2007 | Chen et al. | 725/61 |
| 2007/0186252 A1* | 8/2007 | Maggio | 725/86 |
| 2007/0260679 A1* | 11/2007 | Kikuchi et al. | 709/203 |
| 2007/0271380 A1* | 11/2007 | Chang et al. | 709/225 |
| 2008/0010370 A1* | 1/2008 | Peake et al. | 709/223 |
| 2008/0098118 A1* | 4/2008 | Kutaragi et al. | 709/227 |
| 2008/0250126 A1* | 10/2008 | Stohr et al. | 709/221 |
| 2010/0169277 A1* | 7/2010 | Shyu et al. | 707/622 |
| 2010/0280911 A1* | 11/2010 | Roberts et al. | 705/21 |
| 2010/0281178 A1* | 11/2010 | Sullivan | 709/231 |
| 2011/0225311 A1* | 9/2011 | Liu et al. | 709/231 |

\* cited by examiner

| CONTENT TYPE (LiveType) | SERVER LIST |
|---|---|
| MUSIC_FM | CS12a, CS12b |
| MUSIC_AM | CS12a, CS12c |
| MUSIC_INPUT | CS12a |
| : | : |

| CONTENT TYPE (SECOND TIER) | SERVER LIST |
|---|---|
| Music | CS12a, CS12b, CS12c |
| Video | CS12a |
| Photo | CS12a, CS12c |
| : | : |

INFORMATION PROCESSING DEVICE, CONTENT PROVIDING METHOD AND PROGRAM

CROSS-REFERENCE TO RELATED APPLICATION

The present application claims priority from Japanese Patent Application No. JP 2010-149367 filed in the Japanese Patent Office on Jun. 30, 2010, the entire content of which is incorporated herein by reference.

BACKGROUND

The present disclosure relates to an information processing device, a content providing method and a program.

Recently, a personal computer (PC) and a digital household electrical appliance are widely used in an ordinary home, and a home network for connecting the devices to each other begins to be utilized. There are many cases in which each of a plurality of devices in the home accumulates content such as video, a photograph and music data. A device capable of accumulating the content and delivering content data to another device through the network is also referred to as a media server. Also, a device for receiving the content data from the media server to reproduce the same is also referred to as a media renderer. UPnP AV version 1.0 established by the Universal Plug and Play (UPnP) Forum includes technology referred to as a content directory service (CDS), which realizes simplified access to the content accumulated by the media server. By using the CDS, an external device or a user may browse the content while tracing a hierarchical structure and find desired content to reproduce the same by the media renderer.

In a state in which a plurality of media servers are present in the home, it is desired that a mechanism enabling integrated access of the user to the content is provided. Then, for example, the Japanese Translation of PCT International Application Publication No. 2007-519082 proposes to collect meta data of content provided by a plurality of CDS and re-configure the collected meta data as one virtual-CDS. According to this, a query for searching the content may be efficiently executed. Also, the Japanese Published Unexamined Patent Application No. 2008-40893 proposes to obtain content identification information in advance from a plurality of media servers before activating a content reproducing device and automatically determine the content to be reproduced when activating the content reproducing device based on the content identification information. According to this, time and effort of the user to browse when activating the content reproducing device are reduced.

SUMMARY

However, in the method disclosed in the above-described Japanese Translation of PCT International Application Publication No. 2007-519082, the meta data for all content items accumulated by a plurality of media servers are collected. Therefore, when there are a great number of content items, collection of the meta data applies an excessive load to the network and a reconfiguring process of the CDS demands enormous resources (such as a memory). Also, the method disclosed in the above-described Japanese Published Unexamined Patent Application No. 2008-40893 merely reduces the time and effort to browse when activating the media renderer (content reproducing device). Therefore, when the user accesses the content of the desired type, the user should know the media server, which may provide the content of a desired type.

In light of the foregoing, it is desirable to provide a novel and improved information processing device, content providing method and program, which provide a further improved mechanism enabling the integrated access of the user to the content in a state in which a plurality of servers may be present.

According to an embodiment of the present disclosure, there is provided an information processing device, including a communicating unit capable of communicating with one or more content servers through a network, an information obtaining unit for obtaining content type information indicating a type of content, which may be provided by each of the one or more content servers, from each content server using communication by the communicating unit, and a user interface unit for allowing a user to select a desired content type out of the content type indicated by the content type information and allowing the content server capable of providing at least one content belonging to the selected content type to provide the at least one content. The content type information is the information capable of identifying a type of a container included in a content directory of each content server.

The information processing device may further include a storage unit for storing the content type information, and the information obtaining unit may automatically obtain the content type information from each content server and allows the storage unit to store the content type information.

The user interface unit may display a content type selection screen for allowing the user to select the desired content type based on the content type information stored in the storage unit.

When a plurality of content servers are present, the content type selection screen may be the screen to display both of the type of the content, which can be provided by a first content server, and the type of the content, which can be provided by a second content server.

After the desired content type is selected by the user, when a plurality of content servers are able to provide the content belonging to the selected content type, the user interface unit may allow the user to further select a desired content out of the content belonging to the selected content type, which can be provided by at least one of the plurality of content servers.

After the user selects the content, the user interface unit may specify the content server capable of providing the selected content and allow the specified content server to provide the selected content.

After the user selects the desired content type, when a plurality of content servers can provide the content belonging to the selected content type, the user interface unit may allow the user to further select any of the plurality of content servers.

After the user selects any content server, the user interface unit may allow the user to further select a desired content out of the content belonging to the selected content type, which can be provided by the selected content server.

According to an embodiment of the present disclosure, there is provided a content providing method, including obtaining content type information indicating a type of content, which can be provided by each of one or more content servers, from the one or more content servers through a network, allowing a user to select a desired content type out of the content type indicated by the obtained content type information, and allowing a content server capable of providing at least one content belonging to the selected content type to provide the at least one content. The content type information is the information capable of identifying a type of a container included in a content directory of each content server.

According to an embodiment of the present disclosure, there is provided a program for allowing a computer for controlling an information processing device having a communicating unit capable of communicating with one or more content servers through a network to serve as an information obtaining unit for obtaining content type information indicating a type of content, which may be provided by each of the one or more content servers, from each content server using communication by the communicating unit, and a user interface unit for allowing a user to select a desired content type out of the content type indicated by the content type information and allowing a content server capable of providing at least one content belonging to the selected content type to provide the at least one content. The content type information is the information capable of identifying a type of a container included in a content directory of each content server.

As described above, the information processing device, the content providing method and the program according to the present disclosure may provide the further improved mechanism enabling the integrated access of the user to the content in a state in which a plurality of servers may be present.

DETAILED DESCRIPTION OF THE EMBODIMENT

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The "detailed description of the embodiment(s)" is described in a following order.

1. Outline of Information Processing System
1-1. Configuration Example of System
1-2. Description of Content Directory
2. Configuration Example of Information Processing Device
2-1. Entire Configuration Example of Device
2-2. Communicating Unit
2-3. Information Obtaining Unit
2-4. Storage Unit
2-5. User Interface Unit
2-6. Reproducing Unit
3. Example of Flow of Content Providing Process
3-1. First Scenario
3-2. Second Scenario
4. Hardware Configuration Example
5. Conclusion 1. Outline of Information Processing System First, an information processing system 1 according to one embodiment of the present disclosure is described with reference to FIGS. 1 and 2.

[1-1. Configuration Example of System]

Figure 1:
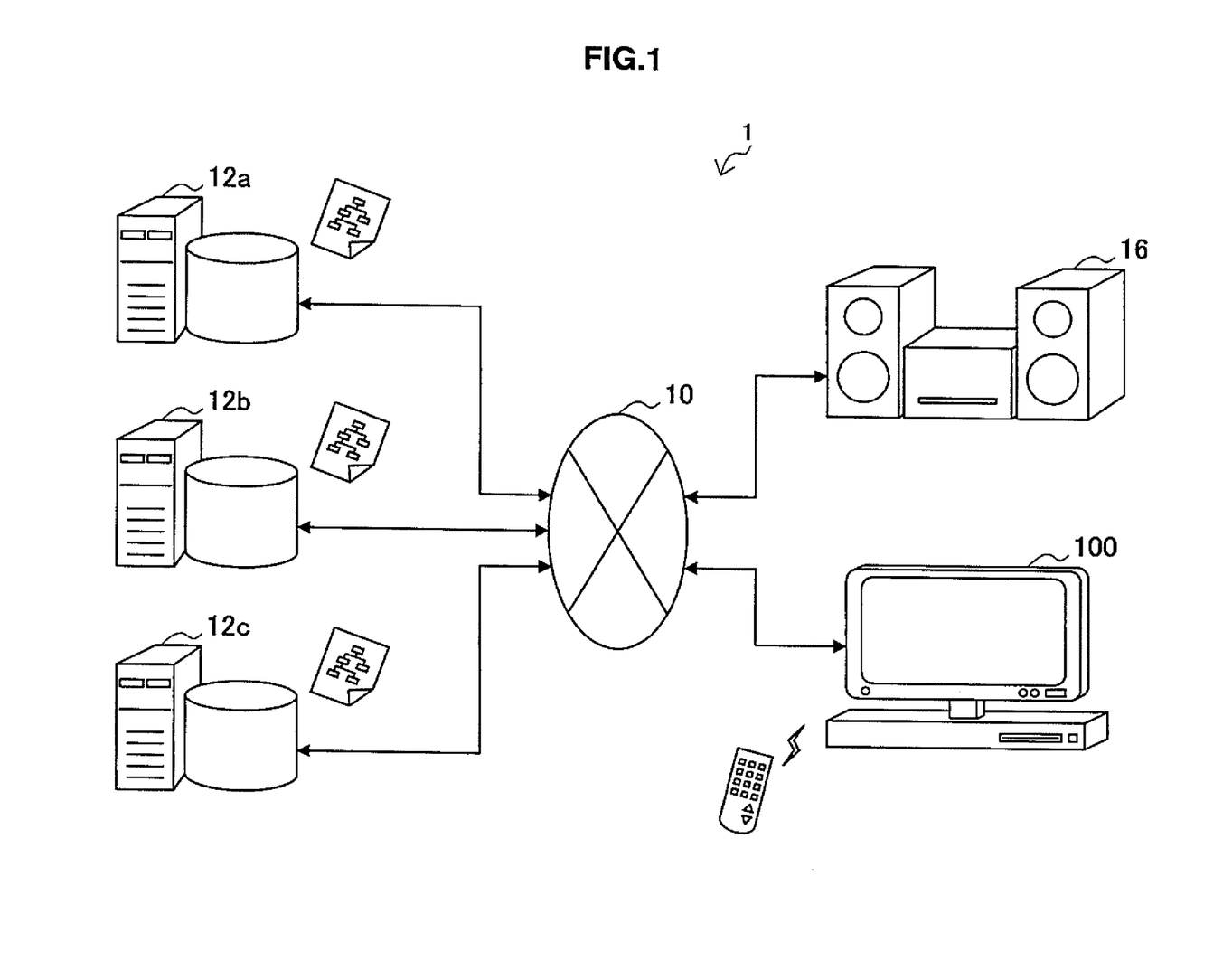
FIG. 1 is a schematic diagram of an outline of an information processing system according to one embodiment.

FIG. 1 is a schematic diagram of an outline of the information processing system 1 according to this embodiment. With reference to FIG. 1, the information processing system 1 includes a plurality of content servers 12a to 12c, a content player 16 and an information processing device 100. A plurality of content servers 12a to 12c, the content player 16 and the information processing device 100 are connected to each other through a network 10.

The network 10 may be a wired local area network (LAN) or a wireless LAN build in a home, a small office and the like, for example. Alternatively, the network 10 may be a personal area network (PAN) build using a connecting technology such as an ultra wide band (UWB) and ZigBee, for example.

Each of a plurality of content servers 12a to 12c has a storage medium for accumulating content such as video, a photograph and music data. Each of the content servers 12a to 12c delivers content data to a designated content player in response to a request from the information processing device 100, for example. Each of the content servers 12a to 12c may be realized using a personal computer (PC) or a network connectable storage, for example. Each of the content servers 12a to 12c may also be a digital media server (DMS), which complies with a digital living network alliance (DLNA), for example.

Meanwhile, in a following description of this specification, when it is not necessary to especially distinguish the content servers 12a to 12c from one another, trailing alphabets of the reference numerals are omitted and they are collectively referred to as the content servers 12. This also applies to another component.

The content player 16 is a device capable of receiving the content data delivered from the content server 12 and reproducing the content. The content player 16 may be realized using a digital television, a digital photo frame or a wireless monitor capable of reproducing the video or the photograph, or a music player or a stereo device capable of reproducing music, for example. The content player 16 may also be a digital media renderer (DMR) or a digital media player (DMP), which complies with the DLNA, for example.

The information processing device 100 is the device, which provides a user interface for a user to browse the content accumulated in the content server 12. Also, the information processing device 100 requests the content server 12, which has the content selected by the user, to deliver the content data about the content. As a result, the content is reproduced by any content player. The information processing device 100 may be realized using the PC, a personal digital assistant (PDA), a smart phone, the digital television and the like, for example. The information processing device 100 may also be the digital media controller (DMC) or the digital media player (DMP), which complies with the DLNA, for example.

In this embodiment, each content server 12 provides a content directory service (CDS) defined by UPnP AV version 1.0. The CDS is a mechanism, which enables a search of the content, which the content server has, and simplified access to the content. In the CDS, each content, which the content server 12 has, belongs to any container in a hierarchical container tree as a content item. That is to say, contents are grouped for each type of the content, which may be provided by each content server 12, and a corresponding content belongs under the container corresponding to each group. Then, each content server 12 may return a content directory, which is data in which an entire or a part (for example, a partial tree not higher than a designated container) of the container tree of its own device is described, to the information processing device 100 in response to the request from the information processing device 100, for example.

[1-2. Description of Content Directory]

Figure 2:
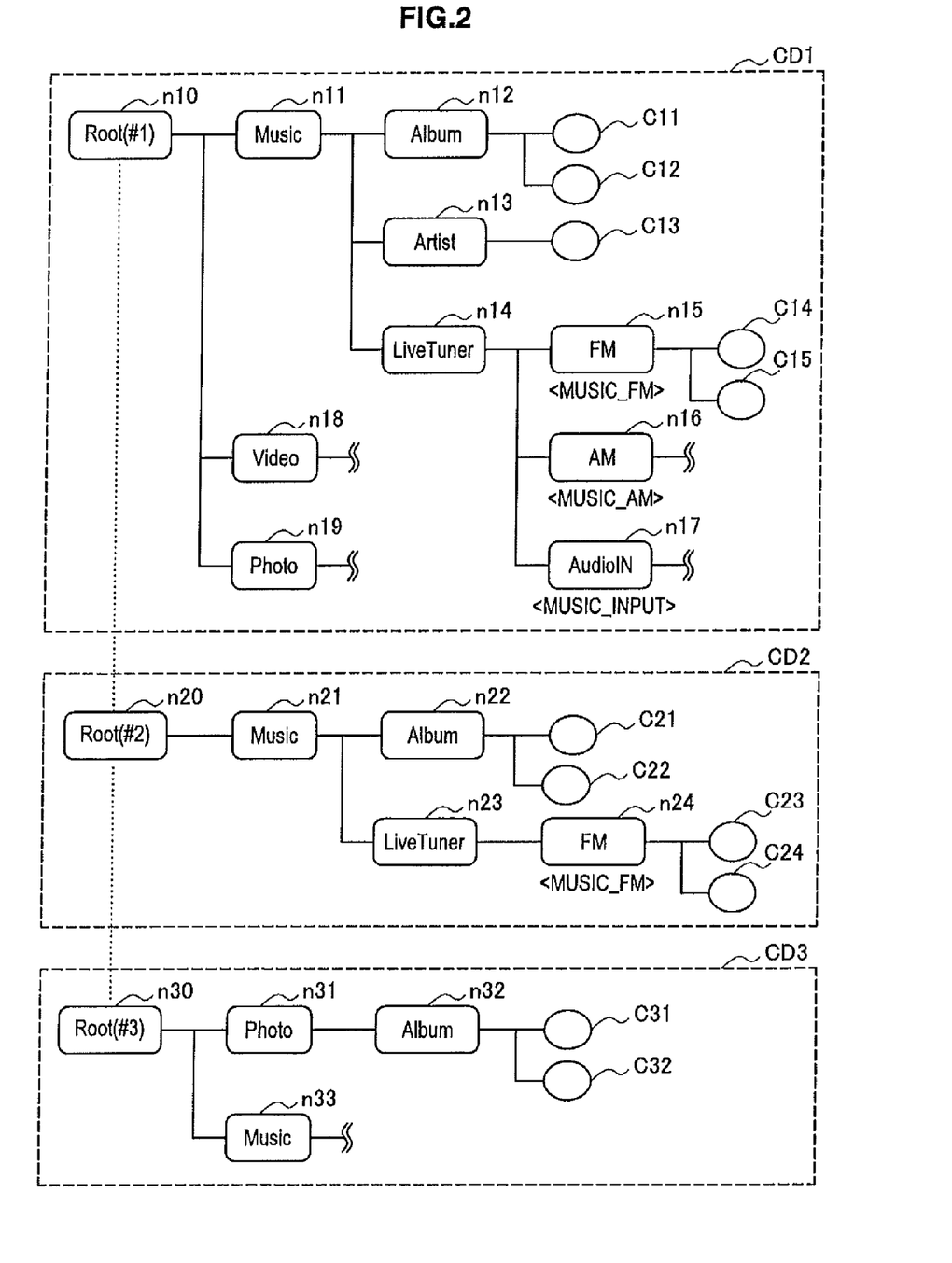
FIG. 2 is an illustrative diagram of an example of a content directory of a content server.

FIG. 2 is an illustrative diagram of an example of the content directory. With reference to FIG. 2, three content directories CD1, CD2 and CD3, which are the container trees of which roots are nodes n10, n20 and n30, respectively, are illustrated.

The content directory CD1 is the content directory about all of the content, which the content server 12a has, for example. The content directory CD1 has three nodes n11, n18 and n19 of "Music", "Video" and "Photo" in a tier immediately below the node n10. They correspond to roughest classification of the content. Also, three nodes n12, n13 and n14 of "Album", "Artist" and "LiveTuner" are present in a tier immediately below the node n11 ("Music"). They correspond to additional classification of the music content. The contents C11 to C13 directly belong to the node n12 ("Album") or the node n13 ("Artist"). On the other hand, three nodes n15 to n17 of "FM", "AM" and "AudioIN" are further present immediately below the node n14 ("LiveTuner"). They correspond to additional classification of the content of a type received through a tuner out of the music content. Contents C14 and C15 belong to the node n15, for example. Further, although not illustrated in FIG. 2, a unique container tree may be present also below the node n18 ("Video") and the node n19 ("Photo").

In the content directory CD1, the nodes n10 to n19 are containers. Each container has an attribute such as a container name. For example, the above-described "Music", "Video" and "Photo" are the container names. Also, for example, the nodes n15, n16 and n17, which are the containers immediately below the node n14 ("LiveTuner") may have an attribute "LiveType". As illustrated, "LiveType"="MUSIC_FM" for the node n15, "LiveType"="MUSIC_AM" for the node n16 and "LiveType"="MUSIC_INPUT" for the node n17. The attributes may be standard attributes defined by the UPnP AV version 1.0 or may be the attributes based on a unique specification expanded uniquely. It may be understood that such attribute of the nodes n11 to n19 except the root indicates a type of the content, which may be provided by the content server 12a.

Similarly, the content directory CD2 is the content directory about all of the content, which the content server 12b has, for example. The content directory CD2 has a node n21 ("Music"), a node n22 ("Album"), a node n23 ("LiveTuner") and a node n24 ("FM") below the node n20. Also, the content directory CD3 is the content directory about all of the content, which the content server 12c has, for example. The content directory CD3 has a node n31 ("Photo"), a node n32 ("Album") and a node n33 ("Music") below the node n30.

Herein, a scene in which the user searches the content of a desired type (not by a keyword search but by a directory search) through the user interface provided by the information processing device 100 is supposed. At that time, when the information processing device 100 simply presents the user with the content directory as illustrated in FIG. 2, the user first selects any of the content servers 12a to 12c. However, when there are a plurality of content servers 12, the user does not necessarily comprehend which content server 12 may provide which type of content. Therefore, the user might select the content server 12b by mistake also when the user wants to reproduce the content of AM broadcast, for example. In this case, the user will know that the content server 12b is not able to provide the content of the AM broadcast after tracing the container tree to a lower tier, for example. Such work is not efficient for the user. Also, when there are a great number of content servers 12, it is difficult that the user correctly memorizes which content server 12 may provide which type of content. Then, the information processing system 1 according to this embodiment improves the above-described disadvantage about the access to the content by a method to be described in detail in a following section.

2. Configuration Example of Information Processing Device

[2-1. Entire Configuration Example of Device]

Figure 3:
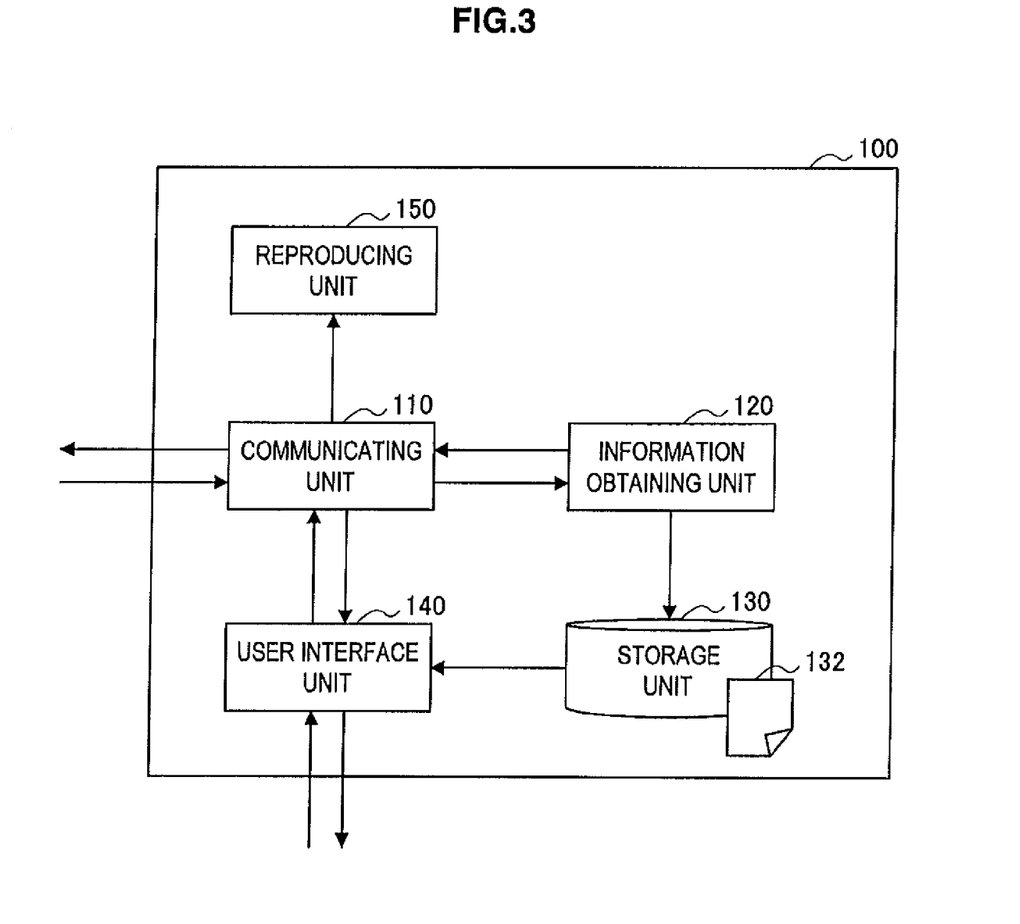
FIG. 3 is a block diagram of an example of a logical configuration of an information processing device according to one embodiment.

FIG. 3 is a block diagram of an example of a logical configuration of the information processing device 100 according to this embodiment. With reference to FIG. 3, the information processing device 100 is provided with a communicating unit 110, an information obtaining unit 120, a storage unit 130, a user interface unit 140 and a reproducing unit 150.

[2-2. Communicating Unit]

The communicating unit 110 communicates with one or more content servers 12 through the network 10. The communicating unit 110 may be a communication interface, which supports an optional communication protocol such as Ethernet™ for the wired LAN or IEEE802.11a/b/g/n for the wireless LAN, for example. The communicating unit 110 transmits the request for the content server 12 input from the information obtaining unit 120 or the user interface unit 140 to the content server 12 through the network 10, for example. Then, the communicating unit 110 receives a response from the content server 12 through the network 10 and outputs the response to the information obtaining unit 120 or the user interface unit 140, for example. Also, when the communicating unit 110 receives the content data from the content server 12, the communicating unit 110 outputs the received content data to the reproducing unit 150, for example.

[2-3. Information Obtaining Unit]

The information obtaining unit 120 obtains content type information indicating the type of the content, which may be provided by each of the one or more content servers 12, from each content server 12 using communication by the communicating unit 110. The content type information obtained by the information obtaining unit 120 may be information capable of identifying the type of the container included in the content directory of each content server 12 illustrated in FIG. 2, for example. An information obtaining process by the information obtaining unit 120 is typically automatically performed without depending on an explicit instruction from the user. For example, the information obtaining unit 120 may periodically obtain the content type information at intervals such as once per day or once per hour. Alternatively, the information obtaining unit 120 may automatically search the content server 12 connected to the network 10 when the user activates the information processing device 100, for example, and obtain the content type information from the detected content server 12. Also, when the information obtaining unit 120 detects that a new content server 12 is connected to the network 10, for example, the information obtaining unit 120 may obtain the content type information from the new content server 12. In this embodiment, the information obtaining unit 120 allows the storage unit 130 to store the obtained content type information in a form of a list of the content servers for each content type.

[2-4. Storage Unit]

The storage unit 130 is formed of a storage medium such as a hard disk, semiconductor memory and the like, for example. Then, the storage unit 130 stores the content type information obtained by the information obtaining unit 120 in a form of a list 132 of the content servers for each content type.

Figure 4:
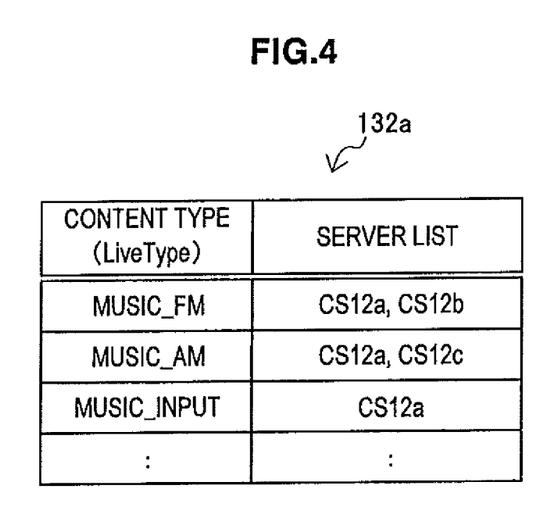
FIG. 4 is an illustrative diagram for illustrating a first example of content type information.

FIG. 4 is an illustrative diagram for illustrating a first example of the content type information stored by the storage unit 130. With reference to FIG. 4, the content type information in a form of a content server list 132*a* is illustrated. In the example in FIG. 4, the "LiveType" attribute of the container included in the content directory is treated as the content type. That is to say, the content server list 132*a* is data in which the content servers 12 including the container having each attribute value in its content directory are listed for each candidate ("MUSIC_FM", "MUSIC_AM", "MUSIC_INPUT" and the like) of the attribute value of the "LiveType" attribute (content type). For example, the server list for "LiveType"="MUSIC_FM" includes the content servers (CS) 12*a* and 12*b*. This means that the content servers capable of providing any channel of FM broadcast as the content are the content servers 12*a* and 12*b*. Also, the server list for "LiveType"="MUSIC_AM" includes the content servers 12*a* and 12*c*. The server list for "LiveType"="MUSIC_INPUT" includes the content server 12*a*. The information obtaining unit 120 obtains the container information about the container having the "LiveType" attribute in the content directory of each content server 12 and registers a group of the attribute value of the "LiveType" attribute included in the obtained container information and an identifier of a corresponding content server 12 in the server list, for example. By such a process, the content server list 132*a* illustrated in FIG. 4 may be generated.

Figure 5:
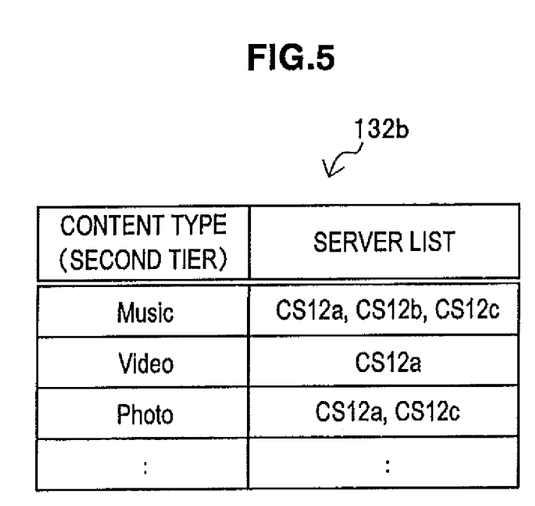
FIG. 5 is an illustrative diagram for illustrating a second example of the content type information.

FIG. 5 is an illustrative diagram for illustrating a second example of the content type information stored by the storage unit 130. With reference to FIG. 5, the content type information in a form of a content server list 132*b* is illustrated. In the example in FIG. 5, the container name of the container in a second tier of the content directory is treated as the content type. That is to say, the content server list 132*b* is data in which the content servers 12 including the container of each container name in its content directory are listed for each candidate ("Music", "Video", "Photo" and the like) of the container name (content type) in the second tier of the content directory. For example, the server list about the "Music" container includes the content servers 12*a*, 12*b* and 12*c*. This means that the content servers capable of providing the music content are the content servers 12*a*, 12*b* and 12*c*. Also, the server list about the "Video" container includes the content server 12*a*. Also, the server list about the "Photo" container includes the content servers 12*a* and 12*c*. The information obtaining unit 120 obtains the container information about the container in the second tier in the content directory of each content server 12 and registers a group of the container name included in the obtained container information and the identifier of the corresponding content server 12 in the server list, for example. By such a process, the content server list 132*b* illustrated in FIG. 5 may be generated.

Meanwhile, the storage unit 130 may store additional information such as an address of each content server 12 and a supported file type in association with the content server list 132 (132*a* or 132*b*) illustrated in FIG. 4 or 5. Also, the content type information stored by the storage unit 130 is not limited to the above-described example. For example, the container name of the container in a tier not higher than a third tier may be treated as the content type. Also, the attribute of the container other than the "LiveType" attribute may be treated as the content type.

Figure 6:
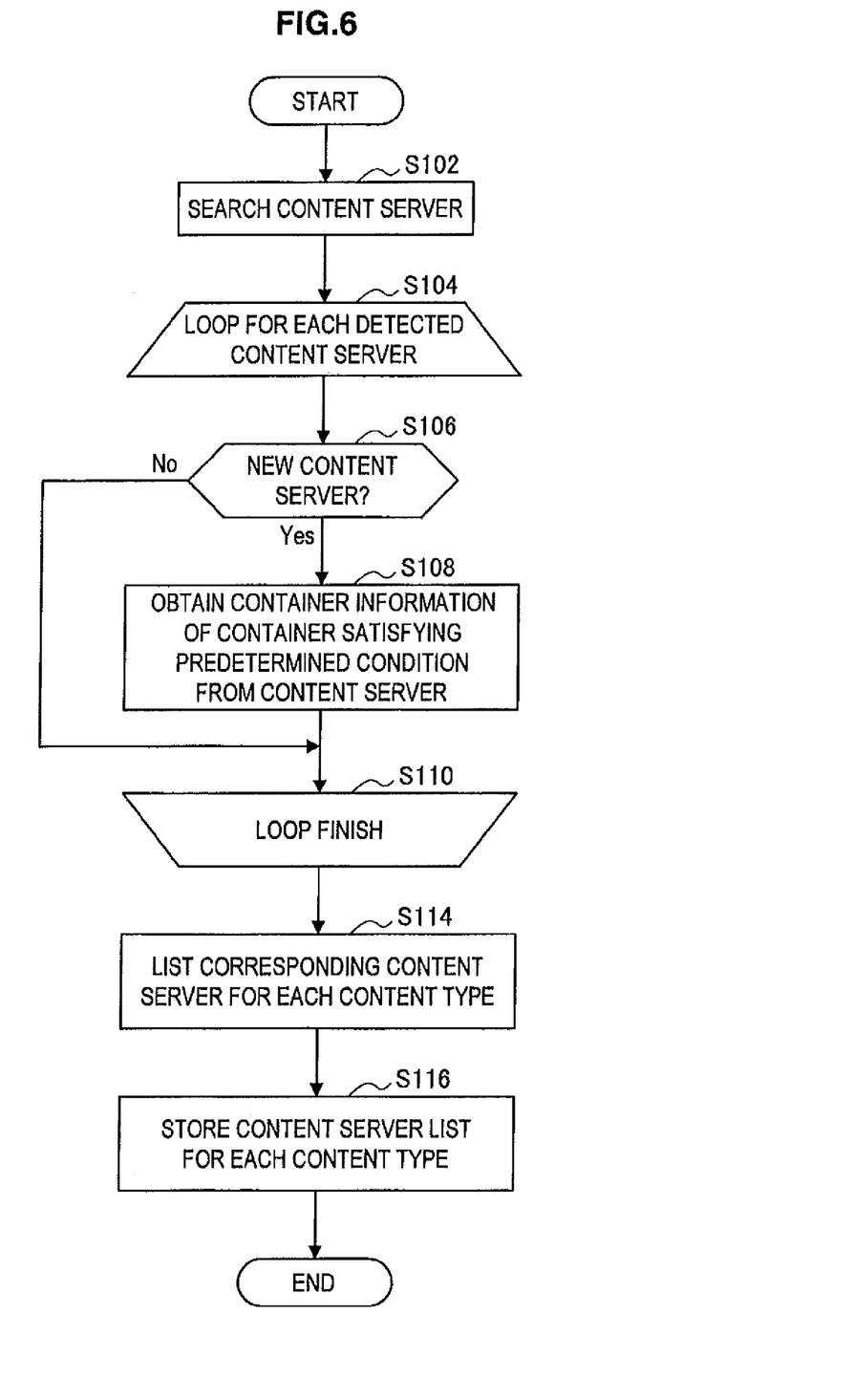
FIG. 6 is a flowchart of an example of a flow of an information obtaining process according to one embodiment.

FIG. 6 is a flowchart of an example of a flow of an information obtaining process by the information obtaining unit 120 according to this embodiment.

With reference to FIG. 6, the information obtaining unit 120 first searches the content server 12 connected to the network 10 (step S102). The communicating unit 110 broadcasts an M-search method defined by a simple service discovery protocol (SSDP) in the network 10, and according to this, the content server 12 may be searched, for example. Next, the information obtaining unit 120 loops processes at steps S106 and S108 for each content server 12 detected as a result of the search (step S104).

In a loop process, the information obtaining unit 120 first judges whether each content server 12 is a new content server (step S106). The new content server is the content server, which has information different from the content type information already registered in the storage unit 130 in the content directory. The information obtaining unit 120 skips the process at the step S108 for the content server 12 judged not to be the new content server. On the other hand, when the content server 12, which is a target of the loop, is the new content server, the information obtaining unit 120 obtains the container information of the container, which satisfies a predetermined condition, from the content server 12 (step S108). The predetermined condition herein may be a condition such as the container having the "LiveType" attribute or the containers down to the second tier based on the root, for example. The communicating unit 110 transmits a browsing request or a search request of the CDS to the content server 12, for example, and according to this, the container information may be obtained.

Next, when the loop process for the content server detected at the step S102 is finished (step S110), the information obtaining unit 120 lists the identifier of the corresponding content server 12 for each content type based on the obtained container information (step S114). For example, when the "LiveType" attribute is treated as the content type as in the example in FIG. 4, the identifier of the corresponding content server for each of "MUSIC_FM", "MUSIC_AM" and "MUSIC_INPUT" may be listed. Then, the information obtaining unit 120 allows the storage unit 130 to store the generated content server list 132 for each content type (step S116).

[2-5. User Interface Unit]

The user interface unit 140 displays a content type selection screen for allowing the user to select the content type of the content, which the user wants to view, on a screen of the information processing device 100 or another device connected to the information processing device 100. The content type selection screen may be generated based on the above-described content type information stored in the storage unit 130, that is to say, the content server list 132 for each content type. As in this embodiment, when a plurality of content servers 12 are connected to the network 10, the content type selection screen is one integrated screen to display at least both of the type of the content, which the first content server may provide, and the type of the content, which the second content server may provide. Then, the user interface unit 140 allows the content server 12 capable of providing at least one content belonging to the content type selected on the content type selection screen to deliver the content. Two examples of a content providing process mainly performed under control of the user interface unit 140 are more specifically described in a following section.

[2-6. Reproducing Unit]

When the communicating unit 110 receives the content data delivered from the content server 12, the reproducing unit 150 reproduces the content desired by the user by performing a rendering process including decoding of the content data and the like. That is to say, the reproducing unit 150 may have a function of the media renderer capable of reproducing the video or audio or both of them, for example. Meanwhile, in the information processing system 1, the content selected by the user may be reproduced by the content player in place of the reproducing unit 150 of the information processing device 100.

3. Example of Flow of Content Providing Process

Next, two scenarios of the content providing process, which may be executed by the information processing system 1 according to this embodiment, are described with reference to FIGS. 7 to 10.

[3-1. First Scenario]

Figure 7:
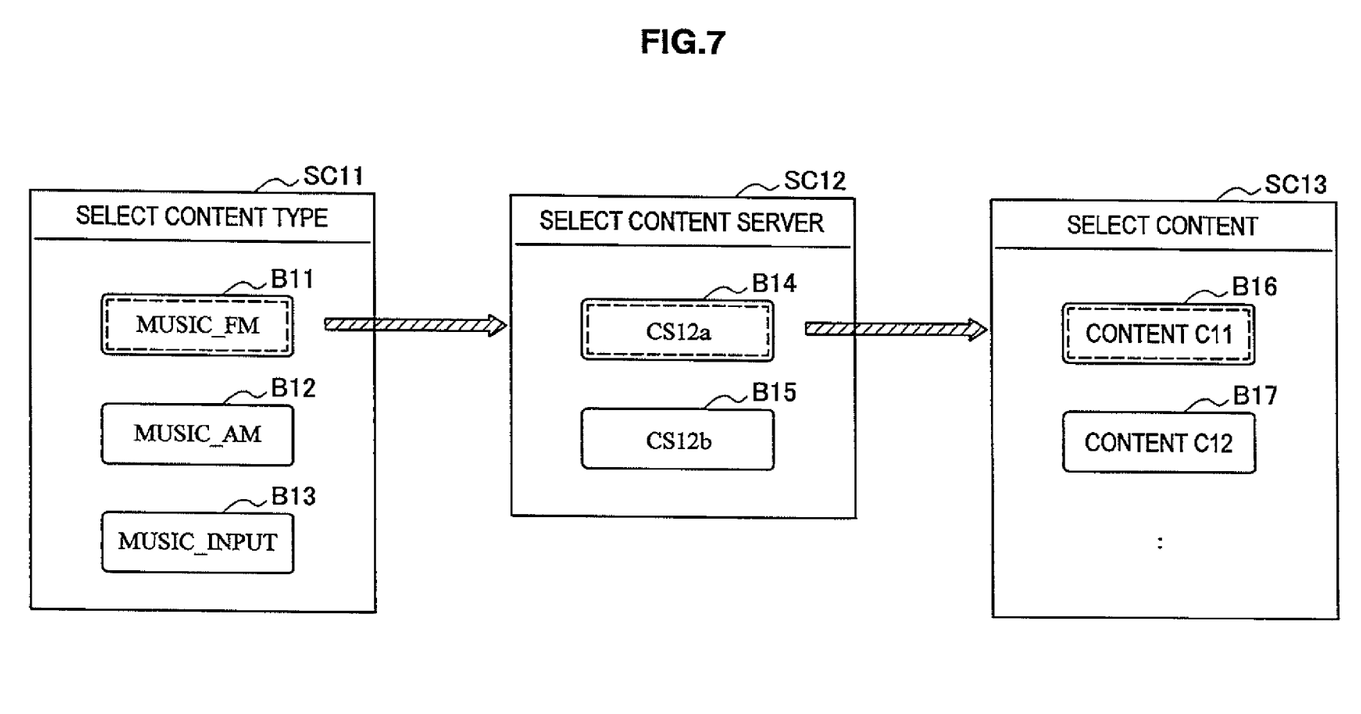
FIG. 7 is an illustrative diagram of a first example of transit of a screen displayed by the information processing device according to one embodiment.

In the first scenario, the user interface unit 140 of the information processing device 100 further displays a server selection screen after the user selects any content type on the content type selection screen. The server selection screen is the screen to display the list of the content servers capable of providing the content belonging to the content type selected on the content type selection screen.

FIG. 7 is an illustrative diagram of an example of transit of the screen displayed by the user interface unit 140 in the first scenario. A content type selection screen SC11 as an example to display a list of options of the content type is illustrated on a left side of FIG. 7. The content type selection screen SC11 has three buttons B11, B12 and B13 for displaying "MUSIC_FM", "MUSIC_AM" and "MUSIC_INPUT", which are the options of the content type, respectively.

When the user wants to reproduce the content of the FM broadcast, for example, the user clicks the button B11 corresponding to "MUSIC_FM". Then, the user interface unit 140 displays a server selection screen SC12 illustrated on center of FIG. 7. The server selection screen SC12 has two buttons B14 and B15, which display the content server 12a ("CS12a") and the content server 12b ("CS12b"), which are the content servers capable of providing the content of the FM broadcast, respectively. The user interface unit 140 may generate such server selection screen SC12 based on the server list included in a record of "MUSIC_FM" in the content server list 132a illustrated in FIG. 4, for example.

When the user wants to reproduce the content of the FM broadcast by the content server 12a, for example, the user clicks the button B14 corresponding to "CS12a". Then, the user interface unit 140 displays a content selection screen SC13 illustrated on a right side of FIG. 7. The content selection screen SC13 has a plurality of buttons B16, B17 and the like for displaying the contents C11, C12 and the like, which are the content of the FM broadcast, which the content server 12a has (which may correspond to each channel of the FM broadcast, for example).

When the user wants to reproduce the content C11, for example, the user clicks the button B16 corresponding to the "content C11". Then, the user interface unit 140 requests the content server 12a to deliver the content data of the content C11 through the communicating unit 110. As a result, the content data of the channel of the FM broadcast, which corresponds to the content C11, for example, is delivered from the content server 12a to the information processing device 100 or the content player 16. Then, the reproducing unit 150 of the information processing device 100 or the content player 16 reproduces the content selected by the user.

Meanwhile, when only one content server 12 connected to the network 10 is available, the server selection screen SC12 is omitted from the screen transit and the one content server 12 may be automatically selected.

By such content providing process, even when a plurality of content servers 12 are available, one integrated content type selection screen SC11 for a plurality of content servers 12 is provided to the user. Then, on the server selection screen SC12, only the content server 12 capable of providing the content belonging to the content type selected by the user is displayed as the option. According to this, the user may certainly select the content server 12 capable of providing the content of the desired type even when the user does not correctly memorize the type of content, which may be provided by each content server 12.

Figure 8:
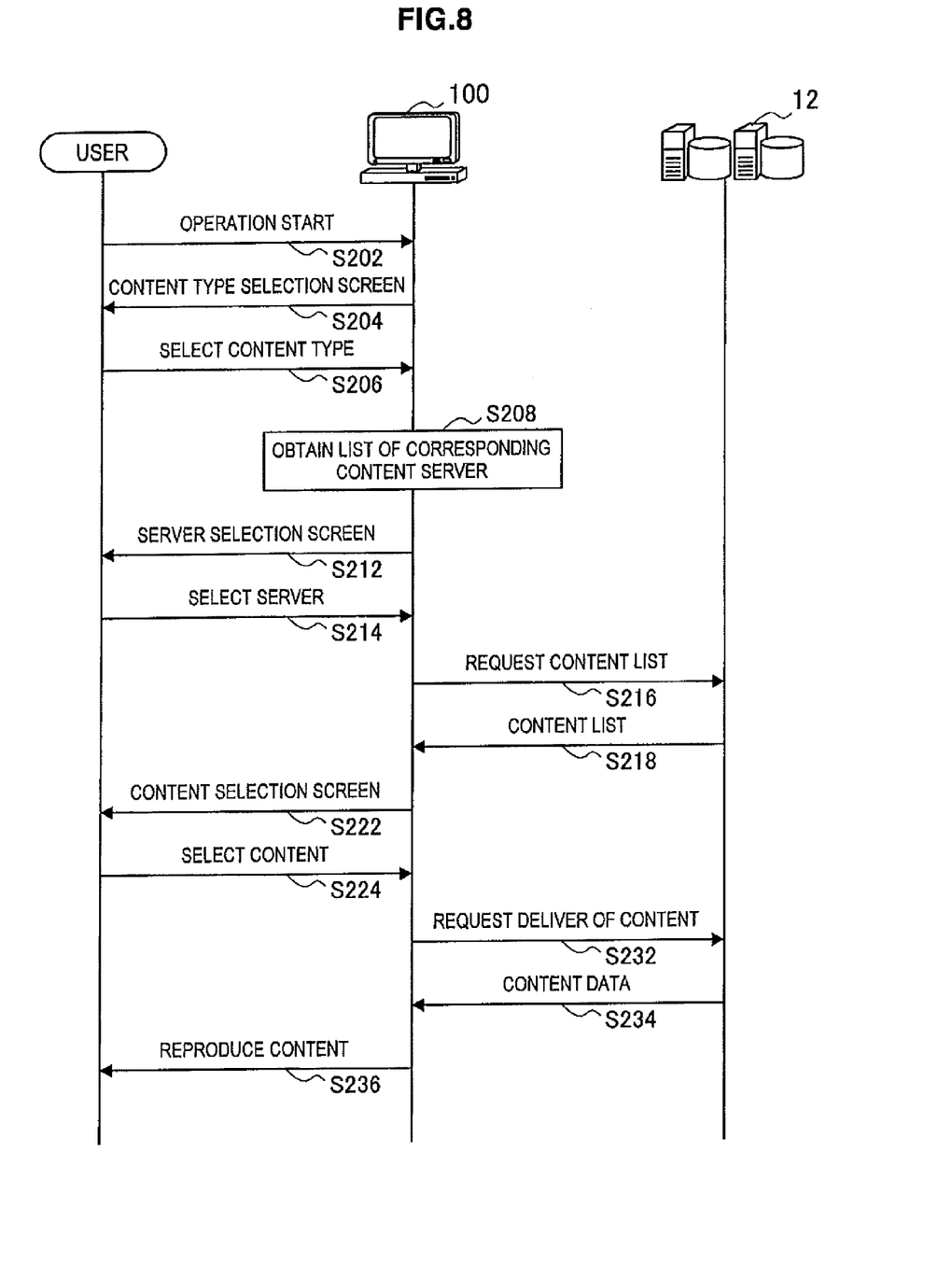
FIG. 8 is a sequence diagram of a first example of a flow of a content providing process according to one embodiment.

FIG. 8 is a sequence diagram of an example of a flow of the content providing process according to this scenario. With reference to FIG. 8, the user first starts operation to receive provision of the content (step S202). Next, the user interface unit 140 of the information processing device 100 displays the content type selection screen (step S204). Next, the user selects a desired content type on the displayed content type selection screen (step S206). Then, the user interface unit 140 of the information processing device 100 refers to the content type information stored in the storage unit 130 to obtain the list of the content servers 12 corresponding to the selected content type (step S208).

Next, the user interface unit 140 displays the server selection screen based on the list obtained at the step S208 (step S212). Next, the user selects a desired content server 12 on the displayed server selection screen (step S214). Next, the user interface unit 140 of the information processing device 100 requests the CDS of the selected content server 12 to provide the list of the contents belonging to the container corresponding to the content type selected at the step S206 (step S216). Then, the CDS of the content server 12, which receives the request, returns the list of the contents belonging to the container corresponding to the designated content type to the information processing device 100 (step S218).

Next, the user interface unit 140 displays the content selection screen based on the content list received from the content server 12 at the step S218 (step S222). Next, the user selects a desired content on the displayed content selection screen (steps S224). Next, the user interface unit 140 of the information processing device 100 requests the content server 12 selected at the step S214 to deliver the selected content (step S232). At that time, the user interface unit 140 may also designate the device to which the content is delivered (for example, the information processing device 100 or the content player 16). Then, the content server 12, which receives the request, delivers the content data of the designated content to the information processing device 100 or the content player 16 (step S234). In the example in FIG. 8, the content server 12 delivers the content data to the information processing device 100. Then, the reproducing unit 150 of the information processing device 100 reproduces the content selected by the user (step S236).

[3-2. Second Scenario]

Figure 9:
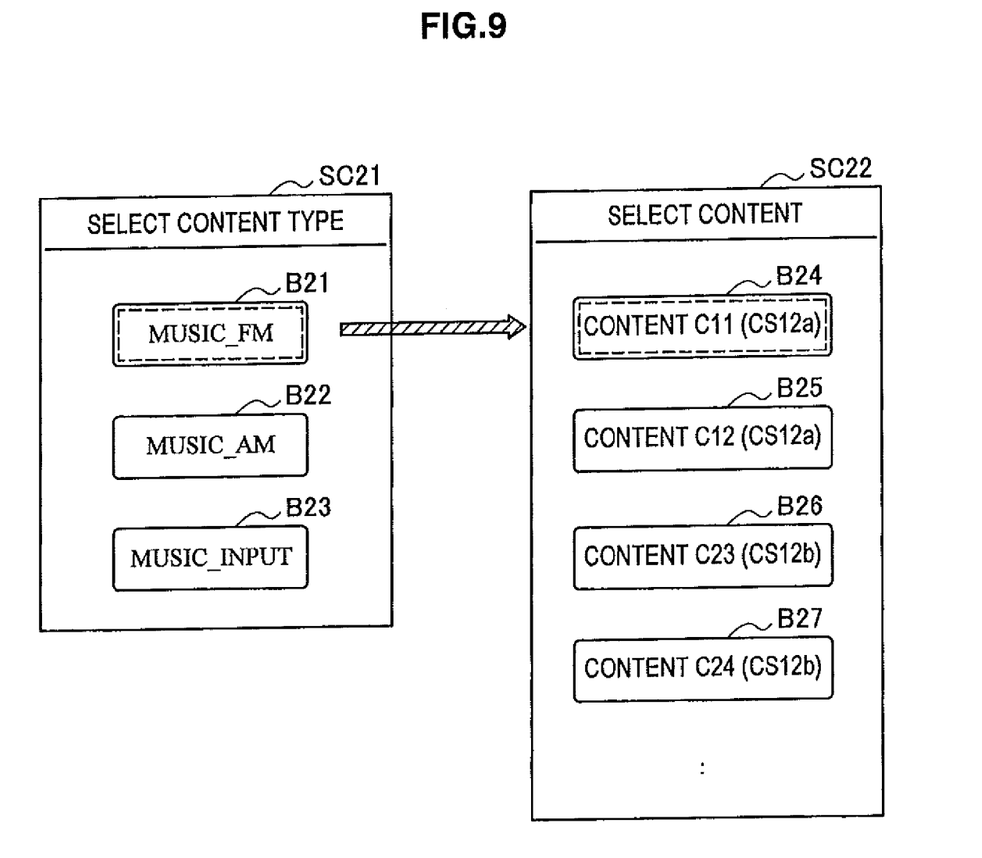
FIG. 9 is an illustrative diagram of a second example of the transit of the screen displayed by the information processing device according to one embodiment.

In a second scenario, the user interface unit 140 of the information processing device 100 does not display the server selection screen after the user selects any content type on the content type selection screen. Instead, the user interface unit 140 presents an integrated list of the contents, which a plurality of content servers capable of providing the content belonging to the content type selected on the content type selection screen have, to the user.

FIG. 9 is an illustrative diagram of an example of transit of the screen displayed by the user interface unit 140 in the second scenario. A content type selection screen SC21 as an example to display the list of the options of the content type is illustrated on a left side of FIG. 9. The content type selection screen SC21 has three buttons B21, B22 and B23 for displaying "MUSIC_FM", "MUSIC_AM" and "MUSIC_INPUT", which are the options of the content type, respectively.

When the user wants to reproduce the content of the FM broadcast, for example, the user clicks the button B21 corresponding to "MUSIC_FM". Then, the user interface unit 140 displays the content selection screen SC22 illustrated on a right side of FIG. 9. The content selection screen SC22 has a plurality of buttons B24, B25, B26, B27 and the like. Out of them, the buttons B24 and B25 are the buttons corresponding to the contents C11 and C12, which are the content of the FM broadcast, which may be provided by the content server 12a, respectively. Also, the buttons B26 and B27 are the buttons corresponding to contents C23 and C24, which are the content of the FM broadcast, which may be provided by the content server 12b, respectively.

When the user wants to reproduce the content C11, for example, the user clicks the button B24 corresponding to the "content C11". Then, the user interface unit 140 requests the content server 12a to deliver the content data of the content C11 through the communicating unit 110. As a result, the content data of the channel of the FM broadcast, which corresponds to the content C11, for example, is delivered from the content server 12a to the information processing device 100 or the content player 16. Then, the reproducing unit 150 of the information processing device 100 or the content player 16 reproduces the content selected by the user.

By such content providing process, also when a plurality of content servers 12 are available, one integrated content type selection screen SC21 for a plurality of content servers 12 is provided to the user. Further, in this scenario, in place of displaying the server selection screen, the content selection screen SC22 displays the integrated list of the contents, which a plurality of content servers have. According to this, the user may reproduce the desired content with the number of operation steps less than that of the first scenario. Also, the user may easily access the content of the desired type even when the user does not correctly memorize the type of the content, which may be provided by each content server 12.

Figure 10:
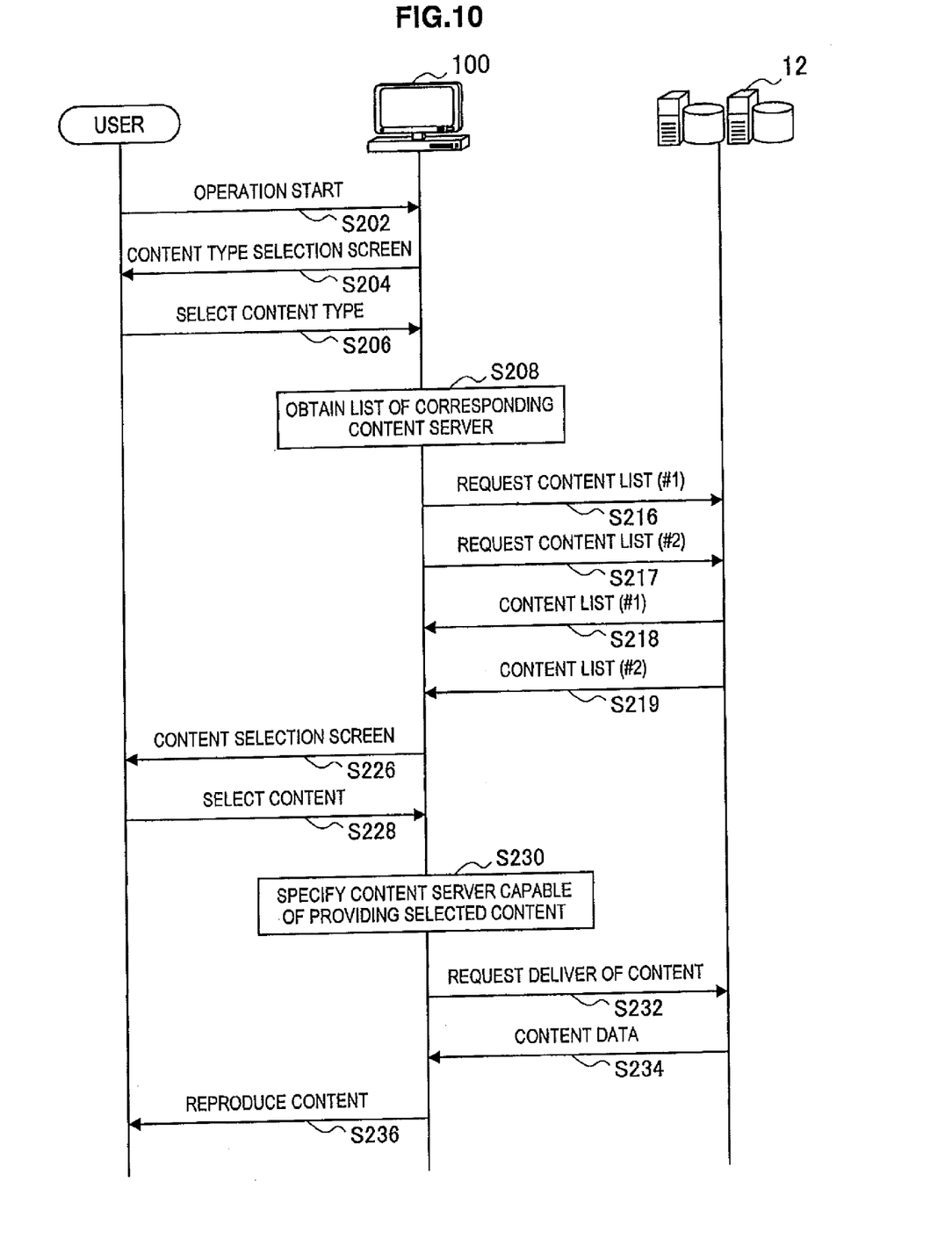
FIG. 10 is a sequence diagram of a second example of the flow of the content providing process according to one embodiment.

FIG. 10 is a sequence diagram of an example of the flow of the content providing process according to this scenario. Meanwhile, the processes from the step S202 to the step S208 in FIG. 10 are similar to those of the first scenario illustrated with reference to FIG. 8.

In this scenario, the user interface unit 140, which obtains the list of the content server 12 corresponding to the content type selected by the user at the step S208, requests the CDS of one or more content servers 12 included in the obtained list to provide the content list (steps S216 and S217). The content list herein requested is the list of the content belonging to the container corresponding to the content type selected at the step S206. Then, the CDS of each content server 12, which receives the request, returns the list of the content belonging to the container corresponding to the designated content type to the information processing device 100 (steps S218 and S219).

Next, the user interface unit 140 displays the integrated content selection screen for a plurality of content servers 12 based on the content list received from the content server 12 at the steps S218 and S219 (step S226). Next, the user selects the desired content on the displayed content selection screen (step S228). Then, the user interface unit 140 of the information processing device 100 refers to the content list received at the steps S218 and S219 and specifies the content server 12 capable of providing the selected content (step S230). Next, the user interface unit 140 requests the specified content server 12 to deliver the selected content (step S232). Then, the content server 12, which receives the request, delivers the content data of the designated content to the information processing device 100 or the content player 16 (step S234). In the example in FIG. 10, the content server 12 delivers the content data to the information processing device 100. Then, the reproducing unit 150 of the information processing device 100 reproduces the content selected by the user (step S236).

Meanwhile, when any content type is selected and the content belonging to the content type is reproduced, the information processing device 100 may allow the storage unit 130 to store identification information of the reproduced content. According to this, the information processing device 100 may automatically select previously reproduced content or automatically focus on the content based on the identification information of the content stored in the storage unit 130 when the same content type is selected next time.

4. Hardware Configuration Example

Figure 11:
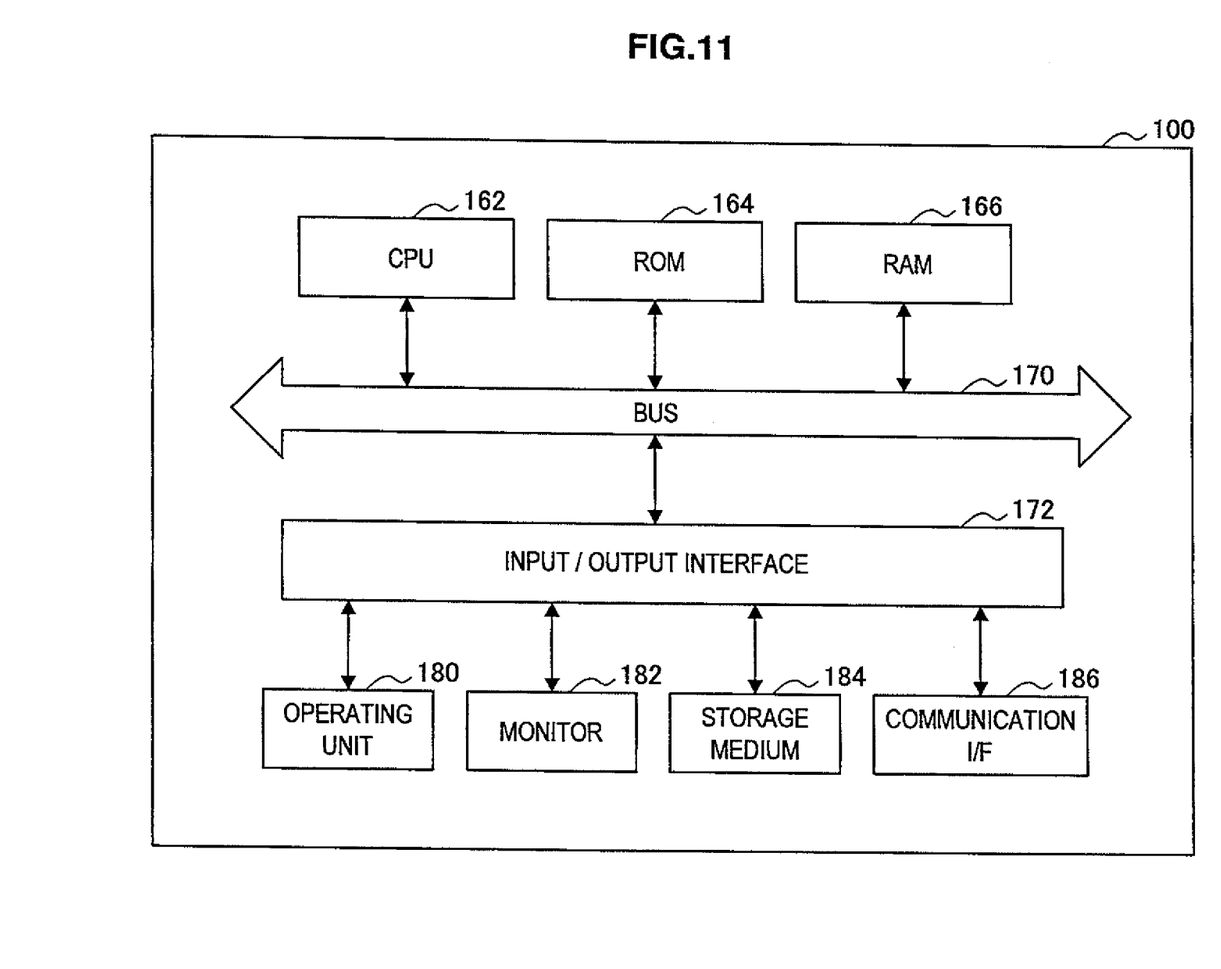
FIG. 11 is a block diagram of an example of a hardware configuration of the information processing device according to one embodiment.

The above-described information obtaining process and content providing process by the information processing device 100 are typically realized by software. FIG. 11 is a block diagram of an example of a hardware configuration of the information processing device 100. With reference to FIG. 11, the information processing device 100 is provided with a central processing unit (CPU) 162, read only memory (ROM) 164, random access memory (RAM) 166, a bus 170, an input/output interface 172, an operating unit 180, a monitor 182, a storage medium 184 and a communication interface (I/F) 186.

The CPU 162 controls entire operation of the information processing device 100. A program or data in which a part or all of series of processes is described is stored in the ROM 164. The program and data used by the CPU 162 when executing the process are temporarily stored in the RAM 166.

The CPU 162, the ROM 164 and the RAM 166 are connected to each other through the bus 170. The input/output interface 172 is further connected to the bus 170. The input/output interface 172 is the interface for connecting the CPU 162, the ROM 164 and the RAM 166, and the operating unit 180, the monitor 182, the storage medium 184 and the communication I/F 186.

The operating unit 180 receives an instruction and an information input from the user through an inputting means such as a button, a touch panel, a mouse, a keyboard, a remote controller and the like, for example. The monitor 182 is formed of a cathode ray tube (CRT), a liquid crystal display and an organic light emitting diode (OLED), for example, for displaying a screen (window) generated by the user interface unit 140 to the user. The storage medium 184 is formed of the hard disk, the semiconductor memory and the like, for example, for storing the program and the data. The communication I/F 186 is a network interface, which supports the communication protocol of the wired LAN or the wireless LAN according to a standard of the network 10, and mediates a communication process by the information processing device 100 through the network 10.

5. Conclusion

One embodiment of the present disclosure is heretofore described with reference to FIGS. 1 to 11. According to this embodiment, when the user wants to reproduce the content in the information processing system 1 in which one or more content servers are present, the information processing device 100 displays the content type selection screen for allowing the user to select the desired content type. The information processing device 100 allows the content server capable of providing at least one content belonging to the selected content type to provide the content. Herein, the above-described content type selection screen is the integrated one screen generated based on the content type information indicating the type of the content, which may be provided by each content server. Therefore, the user does not have to correctly memorize the type of the content, which may be provided by each content server. That is to say, a further improved mechanism enabling integrated access of the user to the content is provided.

Also, according to this embodiment, the content type information is the information, which may identify the type of the container included in the content directory of each content server. That is to say, the information processing device 100 may obtain the above-described content type information without accessing the information about the content item of the lowest tier of the container tree. In general, the number of containers to accommodate the content items is less than the number of the content items. Therefore, it is possible to obtain the above-described content type information without applying an excessive load to the network and without demanding enormous process resources even when there are a great number of content items.

Also, according to this embodiment, the information processing device 100 automatically obtains the content type information from each content server to store. Then, the information processing device 100 displays the above-described content type selection screen based on the content type information stored in advance. Therefore, it is possible to quickly display the integrated content type selection screen when the user wants to reproduce the content.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
   a communicating unit communicating with one or more content servers through a network;
   an information obtaining unit obtaining content type information indicating a type of content, which may be provided by each of the one or more content servers, from each of the one or more content servers using communication by the communicating unit; and
   a user interface unit, when an attribute information indicating a classification of a type of content in accordance with which content is grouped is a same attribute information indicated by the content type information provided from each of a plurality of content servers of the one or more content servers, allowing a user to select the content type corresponding to the same attribute information as a desired content type out of the content type indicated by the content type information and allowing selection by the user, from a display identifying each of the plurality of the content servers displayed responsive to the selection of the selected content type, of a content server from the plurality of content servers, each of the plurality of content servers providing at least one content belonging to the selected content type, to provide the at least one content,
   wherein the content type information is information identifying a type of a container included in a content directory of each of the one or more content servers and determined to satisfy a predetermined condition in which the container is of a predetermined tier in the content directory
   wherein the information processing device further comprises a storage unit storing the content type information,
   the information obtaining unit automatically obtains the content type information from each of the one or more content servers and allows the storage unit to store the content type information; and
   wherein the content type information is determined to satisfy the predetermined condition when the container is of a tier not higher than a second predetermined tier in the content directory.

2. The information processing device according to claim 1, wherein the user interface unit displays a content type selection screen allowing the user to select the desired content type based on the content type information stored in the storage unit.

3. The information processing device according to claim 2, wherein, when a plurality of content servers are present, the content type selection screen is the screen to display both of the type of the content, which can be provided by a first content server, and the type of the content, which can be provided by a second content server.

4. The information processing device according to claim 1, wherein, after the desired content type is selected by the user, when a plurality of content servers are able to provide the content belonging to the selected content type, the user interface unit allows the user to further select a desired content out of the content belonging to the selected content type, which can be provided by at least one of the plurality of content servers.

5. The information processing device according to claim 4, wherein, after the user selects the content, the user interface unit specifies the content server providing the selected content and allows the specified content server to provide the selected content.

6. The information processing device according to claim 1, wherein, after the user selects the desired content type, when a plurality of content servers can provide the content belonging to the selected content type, the user interface unit allows the user to further select any of the plurality of content servers.

7. The information processing device according to claim 6, wherein, after the user selects any content server, the user interface unit allows the user to further select a desired content out of the content belonging to the selected content type, which can be provided by the selected content server.

8. A content providing method, comprising:
obtaining content type information indicating a type of content, which can be provided by each of one or more content servers, from the one or more content servers through a network;
when an attribute information indicating a classification of a type of content in accordance with which content is grouped is a same attribute information indicated by the content type information provided from each of a plurality of content servers of the one or more content servers, allowing a user to select the content type corresponding to the same attribute information as a desired content type out of the content type indicated by the obtained content type information; and
allowing selection by the user, from a display identifying each of the plurality of the content servers displayed responsive to the selection of the selected content type, of a content server from the plurality of content servers, each of the plurality of content servers providing at least one content belonging to the selected content type, to provide the at least one content,
wherein the content type information is information identifying a type of a container included in a content directory of each of the one or more content servers and determined to satisfy a predetermined condition in which the container is of a predetermined tier in the content directory;
wherein the method further comprises storing the content type information, and
the obtaining automatically obtains the content type information from each of the one or more content servers and allows the storage unit to store the content type information; and
wherein the content type information is determined to satisfy the predetermined condition when the container is of a tier not higher than a second predetermined tier in the content directory.

9. A non-transitory recording medium on which is recorded a program allowing a computer controlling an information processing device having a communicating unit communicating with one or more content servers through a network to comprise:

an information obtaining unit obtaining content type information indicating a type of content, which may be provided by each of the one or more content servers, from each of the one or more content servers using communication by the communicating unit; and a user interface unit, when an attribute information indicating a classification of a type of content in accordance with which content is grouped is a same attribute information indicated by the content type information provided from each of a plurality of content servers of the one or more content servers, allowing a user to select the content type corresponding to the same attribute information as a desired content type out of the content type indicated by the content type information and allowing selection by the user, from a display identifying each of the plurality of the content servers displayed responsive to the selection of the selected content type, of a content server from the plurality of content servers, each of the plurality of content servers providing at least one content belonging to the selected content type, to provide the at least one content, wherein the content type information is information identifying a type of a container included in a content directory of each of the one or more content servers and determined to satisfy a predetermined condition in which the container is of a predetermined tier in the content directory, wherein the information processing device further comprises a storage unit storing the content type information, the information obtaining unit automatically obtains the content type information from each of the one or more content servers and allows the storage unit to store the content type information; and wherein the content type information is determined to satisfy the predetermined condition when the container is of a tier not higher than a second predetermined tier in the content directory.

* * * * *